(12) United States Patent
Fujiwara (10) Patent No.: US 7,386,794 B2
(45) Date of Patent: Jun. 10, 2008

(54) APPARATUS AND METHOD FOR PERFORMING THE MANAGEMENT OF OPERATION HISTORY

(75) Inventor: Akihiko Fujiwara, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 858 days.

(21) Appl. No.: 10/392,883

(22) Filed: Mar. 21, 2003

(65) Prior Publication Data

US 2004/0186834 A1  Sep. 23, 2004

(51) Int. Cl.
*G06F 3/00* (2006.01)

(52) U.S. Cl. .................... 715/704; 715/811

(58) Field of Classification Search ............ 715/704, 715/811
See application file for complete search history.

(56) References Cited

U.S. PATENT DOCUMENTS

| | | | | |
|---|---|---|---|---|
| 5,721,903 A | * | 2/1998 | Anand et al. | 707/5 |
| 6,098,047 A | * | 8/2000 | Oku et al. | 705/7 |
| 6,115,680 A | * | 9/2000 | Coffee et al. | 702/187 |
| 6,185,514 B1 | * | 2/2001 | Skinner et al. | 702/188 |
| 6,578,053 B1 | * | 6/2003 | Kidokoro et al. | 707/201 |
| 6,670,974 B1 | * | 12/2003 | McKnight et al. | 715/855 |
| 6,738,973 B1 | * | 5/2004 | Rekimoto | 718/104 |
| 7,043,669 B2 | * | 5/2006 | Brown | 714/45 |
| 7,181,488 B2 | * | 2/2007 | Martin et al. | 709/200 |
| 2002/0002483 A1 | * | 1/2002 | Siegel et al. | 705/10 |
| 2002/0165862 A1 | * | 11/2002 | Richards et al. | 707/9 |
| 2003/0023593 A1 | * | 1/2003 | Schmidt | 707/6 |
| 2003/0172084 A1 | * | 9/2003 | Holle | 707/101 |

FOREIGN PATENT DOCUMENTS

JP  10-021192 A  1/1998

* cited by examiner

*Primary Examiner*—David Wiley
*Assistant Examiner*—Ryan F Pitaro
(74) *Attorney, Agent, or Firm*—Foley & Lardner LLP (57) ABSTRACT

A detecting section 21 detects a conceptual meaning of a respective operation performed upon the execution of a plurality of application programs 11, 12, . . . The result of each detection is stored as respective operation history information in a history information level 32.

17 Claims, 9 Drawing Sheets

| | Application Name | Command | Type | Name | Context | Operation Type | Operation Contents |
|---|---|---|---|---|---|---|---|
| 1 | WebSearch | Post | Submit | Search | WORDS | search | Search KeyWord |
| 2 | WebSearch | Post | Submit | Browse | URL | browse | WebSite Link |
| 3 | WebSearch | Post | Submit | Cache | URL | doc create | WebSite Link |
| 4 | Memo | Post | Submit | OK | Text | doc create | Doc Contents |
| 5 | FileManager | Post | Submit | Check Out | FilePath | edit start | Doc Path |
| 6 | FileManager | Post | Submit | Check In | FilePath | edit end | Doc Path |
| 7 | FileManager | Post | Submit | New | File | doc create | Doc File |

| | Application Name | Command | Type | Name | Context | Operation Type | Operation Contents |
|---|---|---|---|---|---|---|---|
| 1 | WebSearch | Post | Submit | Search | WORDS | search | Search KeyWord |
| 2 | WebSearch | Post | Submit | Browse | URL | browse | WebSite Link |
| 3 | WebSearch | Post | Submit | Cache | URL | doc create | WebSite Link |
| 4 | Memo | Post | Submit | OK | Text | doc create | Doc Contents |
| 5 | FileManager | Post | Submit | Check Out | FilePath | edit start | Doc Path |
| 6 | FileManager | Post | Submit | Check In | FilePath | edit end | Doc Path |
| 7 | FileManager | Post | Submit | New | File | doc create | Doc File |

FIG. 4

Operation history information of Search button
```
<Operation>
<AppName>WebSearch</AppName>
<Date>2002.08.26.15.33</Date>
<Property>"ABC"</Property>
<Operation>search</Operation>
<Operator>XXX</Operator>
</Operation>
```

FIG. 5

Operation history information of Search button
```
<Operation>
<AppName>WebSearch</AppName>
<Date>2002.08.26.15.33</Date>
<Property>"ABC"</Property>
<Operation>search</Operation>
<Operator>XXX</Operator>
</Operation>
```

Operation history information of Browse button
```
<Operation>
<AppName>WebSearch</AppName>
<Date>2002.08.26.15.45</Date>
<Property>"http://~"</Property>
<Operation>browse</Operation>
<Operator>XXX</Operator>
</Operation>
```

Operation history information of Cache button
```
<Operation>
<AppName>WebSearch</AppName>
<Date>2002.08.26.15.48</Date>
<Property>"http://~"</Property>
<Operation>doc create</Operation>
<Path>C:¥store¥html¥~</Path>
<Operator>XXX</Operator>
</Operation>
```

Operation history information of CheckOut button
{
<Operation>
<AppName>FileManager</AppName>
<Date>2002.08.26.13.48</Date>
<Property>"cabinet¥public¥semantic.doc"</Property>
<Operation>edit start</Operation>
<Path>C:¥tmp¥doc¥semantic.doc</Path>
<Operator>XXX</Operator>
</Operation>
}

FIG. 10

Operation history information of Search button:
```
<Operation>
<AppName>WebSearch</AppName>
<Date>2002.08.26.15.33</Date>
<Property>"ABC"</Property>
<Operation>search</Operation>
<Operator>XXX</Operator>
</Operation>
```

Operation history information of Browse button:
```
<Operation>
<AppName>WebSearch</AppName>
<Date>2002.08.26.15.45</Date>
<Property>"http://~"</Property>
<Operation>browse</Operation>
<Operator>XXX</Operator>
</Operation>
```

Operation history information of Cache button:
```
<Operation>
<AppName>WebSearch</AppName>
<Date>2002.08.26.15.48</Date>
<Property>"http://~"</Property>
<Operation>doc create</Operation>
<Path>C:¥store¥html¥~</Path>
<Operator>XXX</Operator>
</Operation>
```

Operation history information of OK button:
```
<Operation>
<AppName>Memo</AppName>
<Date>2002.08.26.16.08</Date>
<Property>"Ontology is ~"</Property>
<Operation>doc create</Operation>
<Path>C:¥store¥memo¥~</Path>
<Operator>XXX</Operator>
</Operation>
```

| | Application Name | Command | Type | Name | Context | Operation Type | Operation Contents |
|---|---|---|---|---|---|---|---|
| 1 | FileManager | Post | Submit | Check Out | FilePath | edit start | Doc Path |
| | WebSearch | Post | Submit | Search | Any text | search | Search KeyWord |
| | WebSearch | Post | Submit | Browse | URL | browse | WebSite Link |
| | FileManager | Post | Submit | Check In | FilePath | edit end | Doc Path |

Operation history information of CheckOut button:
```
<Job>
<Operation>
<AppName>FileManager</AppName>
<Date>2002.08.26.13.48</Date>
<Property>"cabinet¥public¥semantic.doc"</Property>
<Operation>edit start</Operation>
<Path>C:¥tmp¥doc¥semantic.doc</Path>
<Operator>XXX</Operator>
</Operation>
```

Operation history information of Search button:
```
<Operation>
<AppName>WebSearch</AppName>
<Date>2002.08.26.15.33</Date>
<Property>"ABC"</Property>
<Operation>search</Operation>
<Operator>XXX</Operator>
</Operation>
```

Operation history information of Search button:
```
<Operation>
<AppName>WebSearch</AppName>
<Date>2002.08.26.15.45</Date>
<Property>"http://~"</Property>
<Operation>browse</Operation>
<Operator>XXX</Operator>
</Operation>
```

Operation history information of OK button:
```
<Operation>
<AppName>Memo</AppName>
<Date>2002.08.26.16.08</Date>
<Property>"Ontology is ~"</Property>
<Operation>doc create</Operation>
<Path>C:¥store¥memo¥~</Path>
<Operator>XXX</Operator>
</Operation>
```

Operation history information of CheckIn button:
```
<Operation>
<AppName>FileManager</AppName>
<Date>2002.08.26.13.48</Date>
<Property>"cabinet¥public¥semantic.doc"</Property>
<Operation>edit end</Operation>
<Path>C:¥tmp¥doc¥semantic.doc</Path>
<Operator>XXX</Operator>
</Operation>
</Job>
```

Operation history information of a job unit

APPARATUS AND METHOD FOR PERFORMING THE MANAGEMENT OF OPERATION HISTORY

BACKGROUND OF THE INVENTION

In the management of the history of human input operations in a device with a plurality of built-in application programs, such as an application configured to search a Web page on a network through an operation by the operator and an application program configured to create an electronic document through an operation by an operator, it is common to collect the summary of the respective operations, for example, the name of the operation, the date and hour of the operation, etc.

However, the mere collection of the summary of these operations is inadequate to secure the management of the operation history.

Jpn. Pat. Appln. KOKAI Publication No. 10-21192 for example discloses the idea of collecting, as a history, not only a superficial summary of respective operations, but also the mutual relation of dependency among a series of such operations.

In this example, however, the respective operations performed upon the execution of a plurality of application programs cannot be grasped as a common concept among the respective mutual programs.

BRIEF SUMMARY OF THE INVENTION

It is accordingly the object of the present invention to provide an apparatus and method for performing the management of operation history, which can grasp respective operations performed upon the execution of a plurality of application programs as a common concept among the respective mutual application programs.

In one aspect of the present invention there is provided an apparatus for performing the management of operation history, comprising a detecting section configured to, at each performance of a human input operation, detect a conceptual meaning of the respective operation; and a memory section configured to store a result of detection by the detecting section as respective operation history information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 13 is a view showing a format of a plurality of operation history information collected as a job unit in the second embodiment of the present invention.

DETAILED DESCRIPTION OF THE INVENTION

Figure 1:
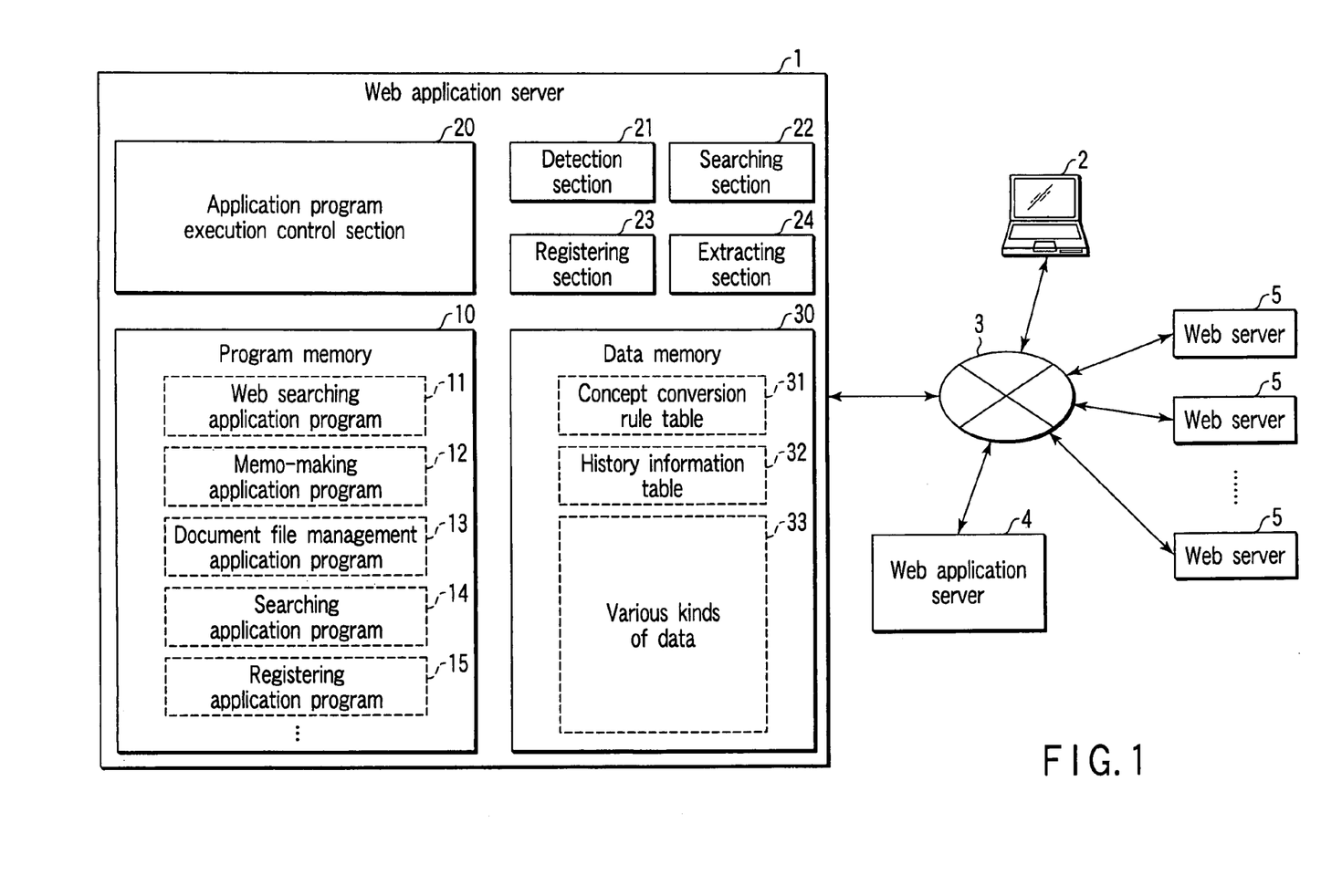
FIG. 1 is a view showing a structure of each of first and second embodiments of the present invention.

[1] An Explanation will Be made below about a First Embodiment of the Present Invention As shown in FIG. 1, a Web application server 1 and terminal (for example, a personal computer) 2 are connected via a communication network 3. To the communication server 2, a Web application server 4 and many Web servers 5 are further connected.

The Web application server 1 includes a program memory 10, application program execution control section 20, detecting section 21, searching section 22, registering section 23, extracting section 24 and data memory (memory section) 30.

In the program memory 10, a Web searching application program 11, a memo-making application program 12, document file management application program 13, searching application program 14, registering application program 15, and so on, are provided.

The application program execution control section 20 loads one or more application programs from the program memory 10 and executes the loaded one or more application programs. In the data memory 30, a concept conversion rule table 31, history information table 32 and various kinds of data groups 33 are stored.

Each time the one or more application programs are executed by the application program execution control section 20 and, with this execution, the operator's input operation is performed on the terminal 2, the detecting section 21 detects the conceptual meaning of each operation. In more detail, by collecting the summary of the operation, such as a "now executing" application program name and date and hour of the operation, with the respective concept conversion rules in the concept conversion rule table 31, the detecting section detects a "conceptual meaning" (meaning information) of the respective operation. Further, the detecting section 21 allows the detected respective meaning information to be stored as the operation history information in the history information table 32.

The searching section 22 searches, from the operation history information in the history information table 32, one or more pieces of operation history information on the basis of input information (keyword) from the terminal 2. The searching section 21 allows the searched one or more pieces of operation history information to be displayed as an output of display on a display section on the terminal 2. The process performed by the searching section 21 is enabled by the searching application program 14.

The registering section 23 registers one or more new concept conversion rules which are inputted from the terminal 2 onto the concept conversion rule table 31. The process by the registering section 23 is performed under the registering application program 15.

The extracting section 24 extracts, from the respective operation history information in the history information table 32, a linking pattern characteristic of a plurality of mutually associated operations. Further, the extracting section 24 allows the extracted linking pattern to be displayed as an output of display on the display section on the terminal 2. The process by the extracting section 24 is also executed by the registering application program 15.

Figure 2A:
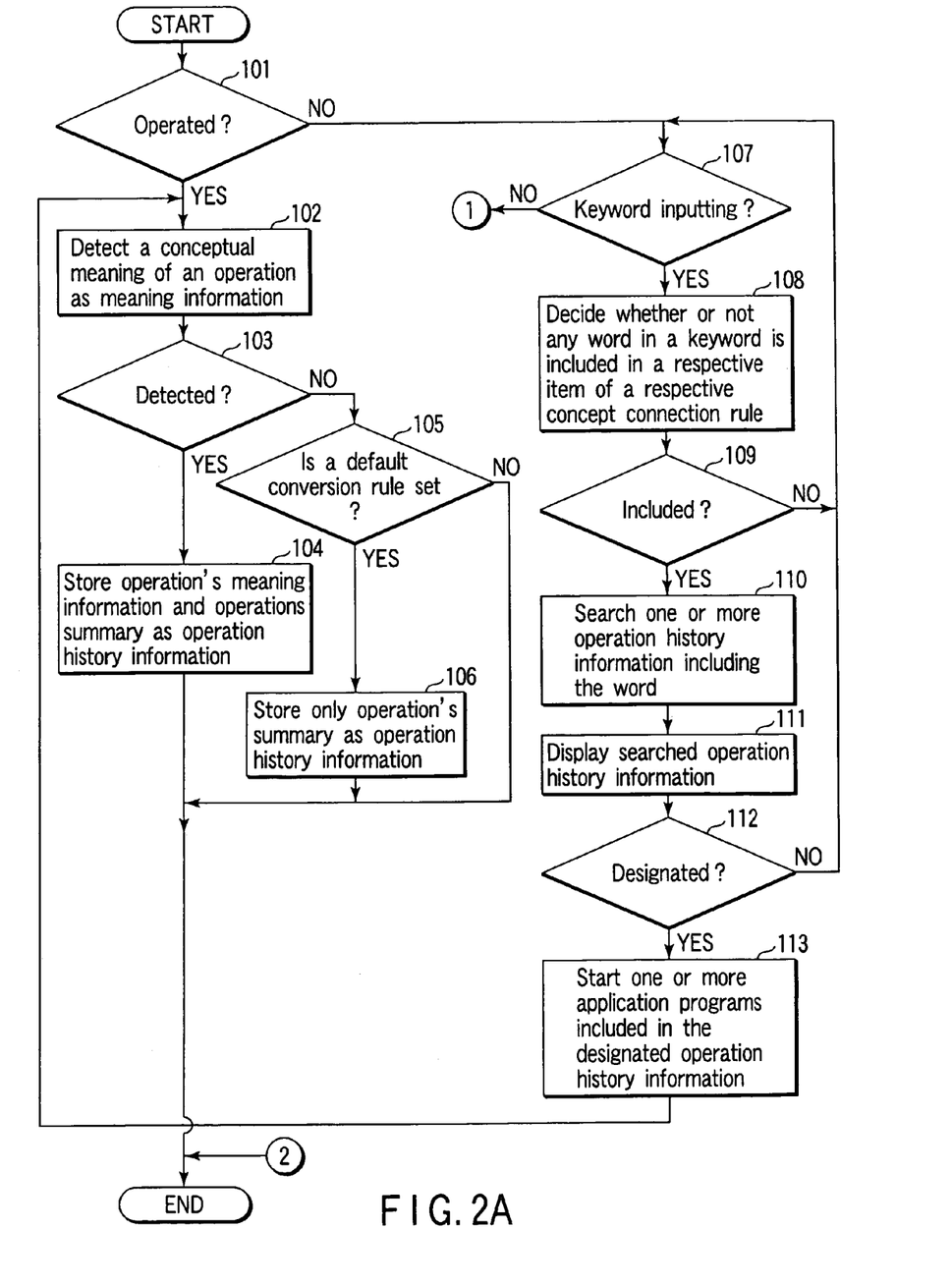
FIGS. 2A and 2B show a flow chart for explaining an operation of each embodiment.
Figure 2B:
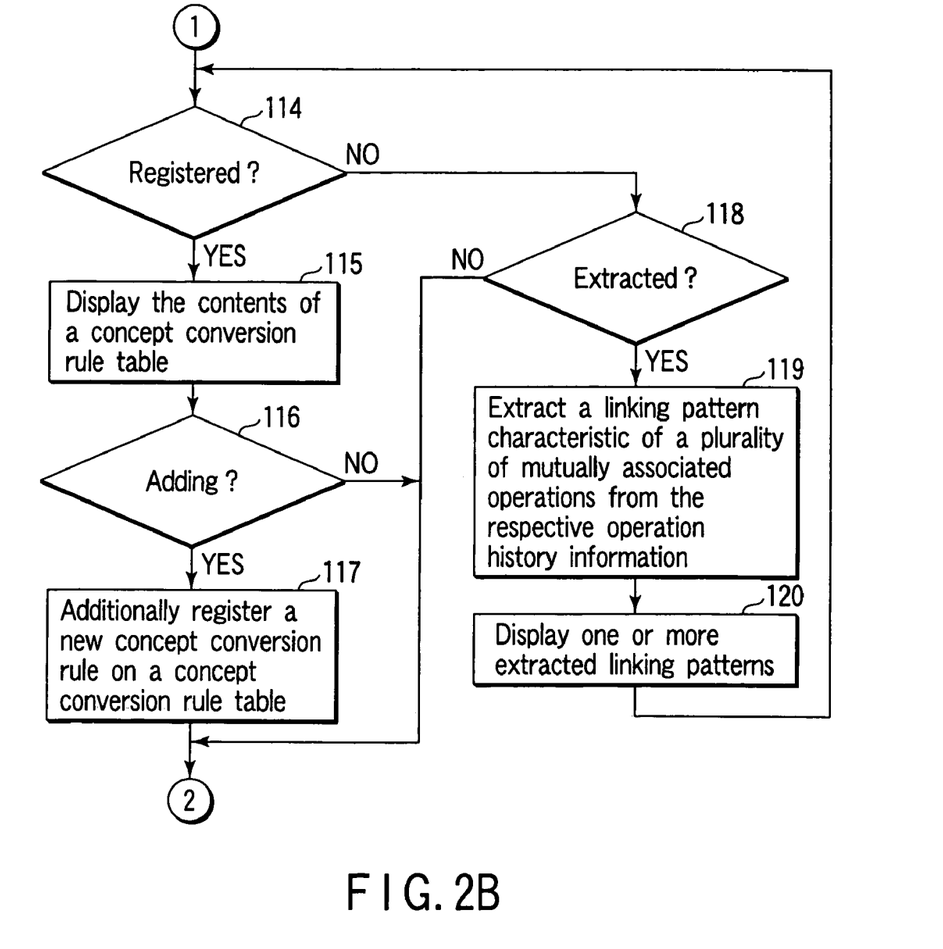

The process will now be explained below by referring to a flow chart in FIGS. 2A, 2B.

(1) An explanation will be made below about respective operations performed in connection with the execution of the Web searching application program.

Figure 3:
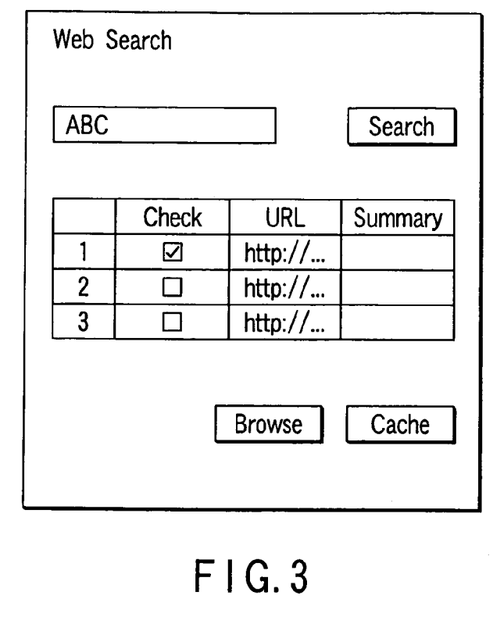
FIG. 3 is a view showing an operation screen for Web searching in the first embodiment of the present invention.

When the Web searching application program 11 is started by gaining access to the Web application server 1 from the terminal 2, the Web searching operation screen is displayed on the display section on the terminal 2. The operator on the terminal 2 inputs one or more keywords (character string) to a character input window in the operation screen and clicks a Search button on the operation screen. This operation is notified to the Web application server 1.

Each time the respective operation is performed on the terminal 2, the meaning information of the respective operation is detected in the Web application server 1—step 102. That is, collation is made between the summary of the operation and the respective concept conversion rule in the concept conversion rule table 31 and the meaning information of the respective operation is detected by doing so.

Figure 4:
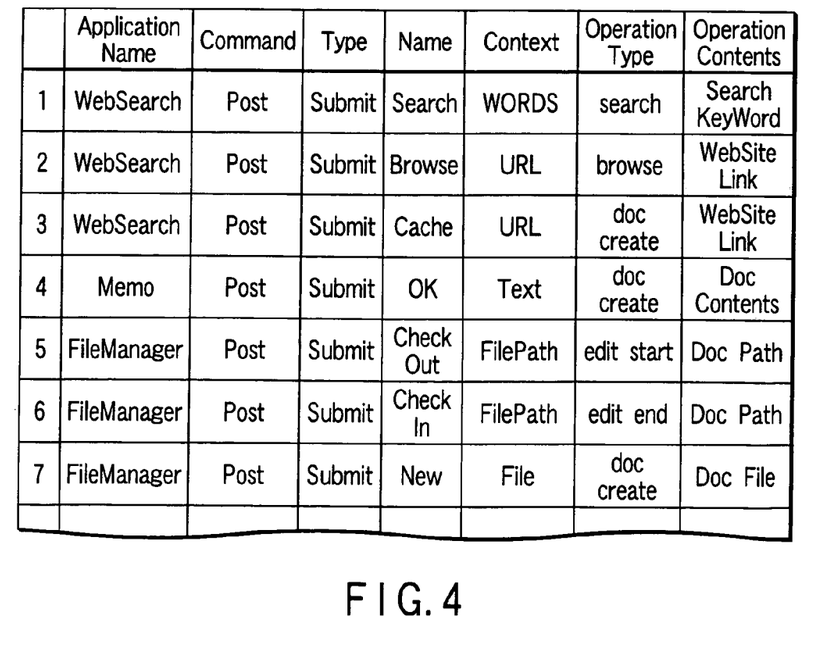
FIG. 4 is a view showing a format of respective concept conversion rules in the first embodiment.

The respective concept conversion rule in the concept conversion rule table 31 includes those items "Application Name", "Command", "Type", "Name", "Context", "Operation Type" and "Operation Contents" as shown in FIG. 4.

In connection with the click operation of the Search button, a first-row concept conversion rule is applied and meaning information is detected, meaning "The operation of the Search button of Submit type Posted under the Web search application program is done to search a Web page using WORDS notified under Context as a search key".

Figure 5:
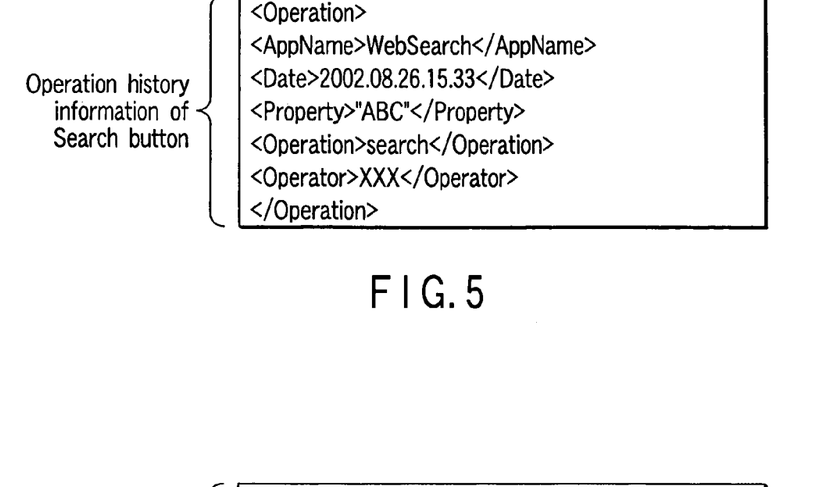
FIG. 5 is a view showing a format of one operation history information relating to a Web searching in the first embodiment.

When the meaning information is detected (YES in step 103), the meaning information, together with a summary of the click operation of the Search button (the presently executed application program name, operation time and hour, Operation Type, operator name, etc.), is stored as operation history information in the history information table 32 (step 104). The operation history information of the Search button is shown in FIG. 5.

When, based on the inputted keyword, one or more Web pages are searched from a respective Web server 5, the URL of the searched one or more Web pages appears as a table, as shown in FIG. 3, on the operation screen for Web searching. By inputting a Check mark into any Check box in the table and clicking the Browse button, the operator on the terminal 2 can browse the Web page of URL under the Check mark inputted column on the display section on the terminal 2. In the case where the operator on the terminal 2 inputs a Check mark into the Check box in the table above and clicks a Cache button, URL on the Check mark inputted column is cached as a document in the data memory 30.

Each time the click operations of the Browse button and Cache button are performed, the corresponding meaning information is detected (step 102).

By applying the concept conversion rule on a second row in FIG. 4 upon the click operation of the Browse button, meaning information is detected, meaning "The operation of the Browse button of a Submit type Post under the Web searching application program is done to Browse the Web page of URL noticed under Context".

By applying the concept conversion rule on a second row in FIG. 4 upon the click operation of the Cache button, meaning information is detected, meaning "The operation of the Cache button of Submit type Posted under the Web searching application program is done to create URL, as a document, which is notified under Context".

Figure 6:
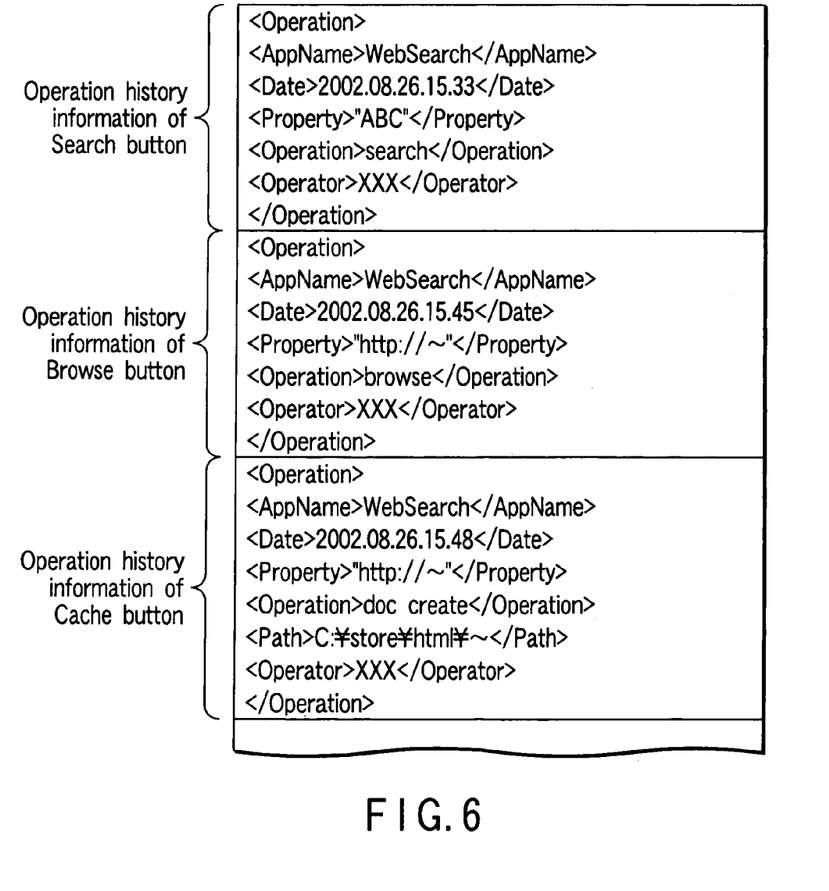
FIG. 6 is a view showing a format of a plurality of operation history information relating to Web searching in the first embodiment.

When the meaning information is detected (YES in step 103), then this meaning information, together with the summary of the operation, is stored as operation history information in the history information table 32—step 104. That is, as shown in FIG. 6, subsequent to the operation history information of the Search button, the operation history information of the Browse button and operation history information of the Cache button are stored.

The operation history information of the Browse button comprises the name of the Web searching application program 11, date and hour of the click operation of the Browse button, meaning information, Operation Type and operator name. The operation history information of the Cache button comprises the name of the Web searching application program 11, time and hour of the click operation of the Cache button, meaning information, Operation Type, path and the name of the operator. The path represents a storage location of the cached document.

If no concept conversion rule fitted to an operation is present on the concept conversion table 31 and no meaning information is detected (NO in step 103), only a summary of the operation is stored as operation history information in the history information table 32 (step 106) as long as a default conversation rule is initially set (YES in step 105). If no default conversion table is initially set (NO in step 105), the operation history information is not stored.

(2) Now an explanation will be made below about the operations performed upon the execution of the memo-making application program 12.

Figure 7:
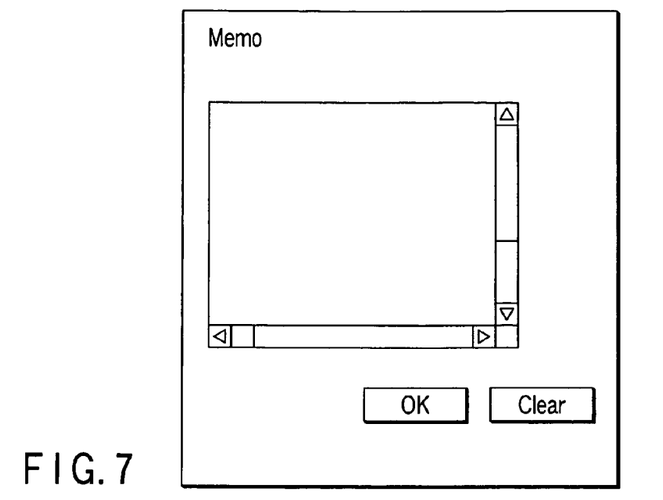
FIG. 7 is a view showing an operation screen for memo making in the first embodiment.

When the mono-making application program 12 is started by gaining access to the Web application server 1 from the terminal 2, an operation screen for the memo-making operation is displayed on a display section on the terminal. The operator on the terminal 2 inputs a text (character string) into the text box on the operation screen and then clicks an OK button on the operation screen. The operation is notified to the Web application server 1.

By the click operation of the OK button, the text inputted into the text box is stored as a document file in the data memory 30.

In the Web application server 1, upon each operation at the terminal 2, the meaning information of the respective operation is detected (step 102).

By applying a fourth-row concept conversion rule (FIG. 4) upon the click operation of the OK button above, meaning information is detected, meaning "The operation of the OK button of Submit type Posted under the memo-making application program is done to create a text, as a document, which is notified under Context".

Figure 8:
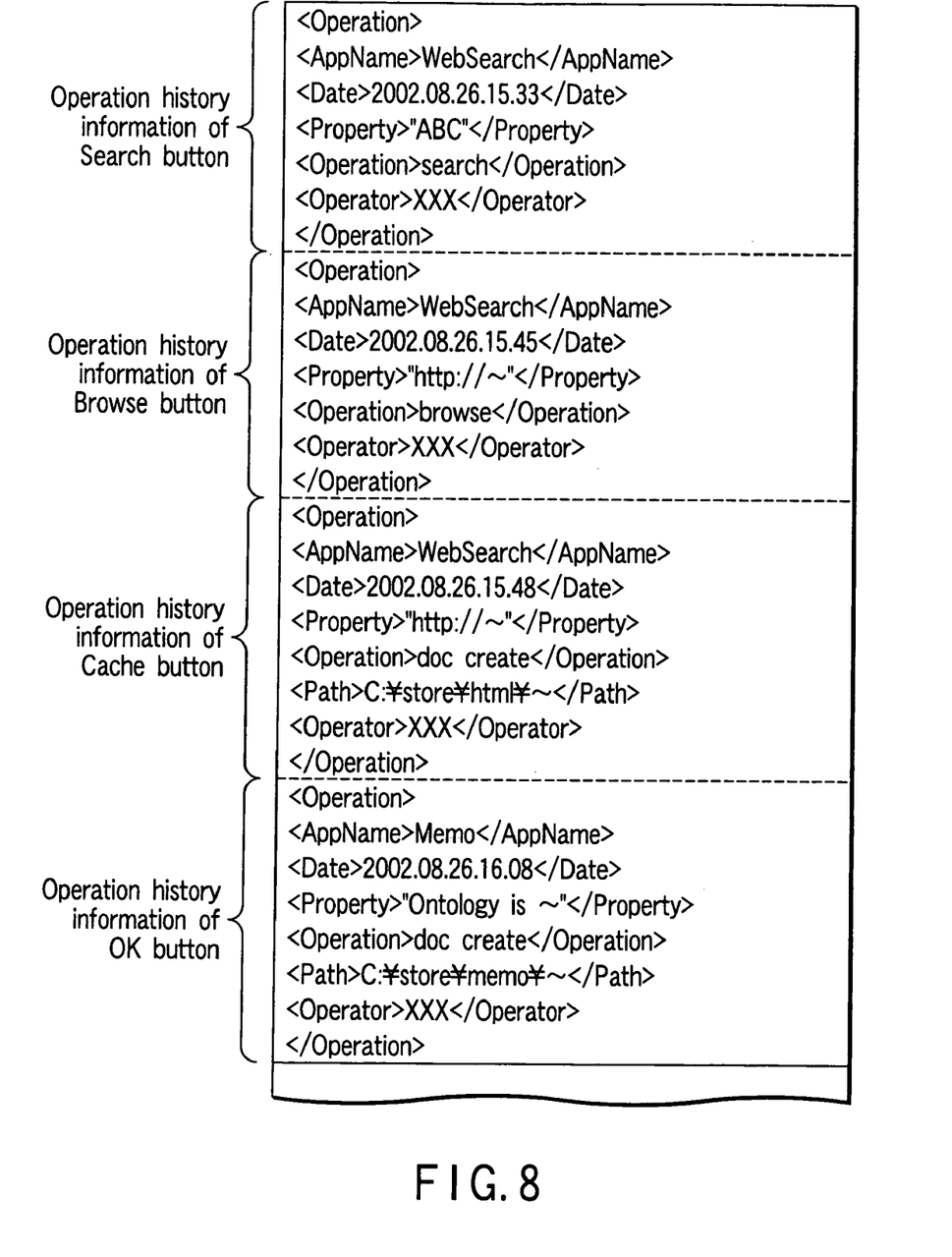
FIG. 8 is a view showing a format of a plurality of operation history information relating to memo making in the first embodiment.

When the meaning information is detected (YES in step 103), the meaning information, together with the summary of the click operation of the OK button, is stored as operation history information in the history information table 32 (step 104). That is, the operation history information of the OK button comprises the name of the memo-making application program 12, time and hour of the click operation of the OK button, meaning information, Operation Type, Path and name of an Operator. The Path represents a storage location of the document file.

(3) An explanation will be made below about the respective operations performed under the execution of a document file management application program 13.

Figure 9:
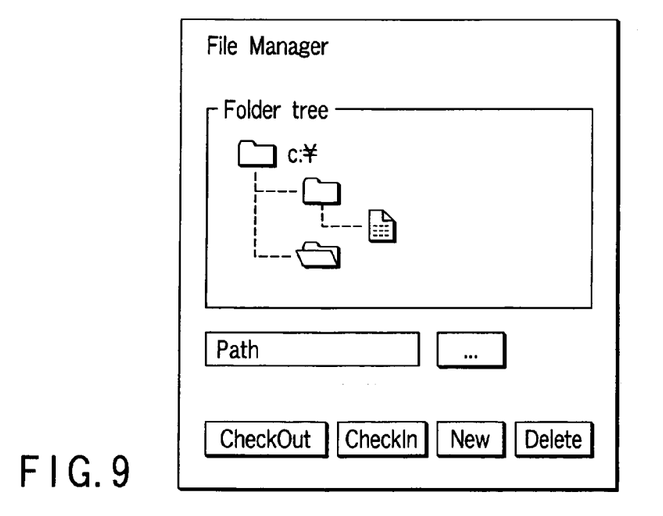
FIG. 9 is a view showing an operation screen relating to a document file management in the first embodiment.

When the document file management application program 13 is started by gaining access to the Web application server 1 from the terminal 2, then an operation screen for a document management shown in FIG. 9 is displayed on a display section on the terminal 2. On the operation screen, a plurality of folders stored in the data memory 30 are displayed in a branched fashion. A larger number of document files are stored in the respective folders.

The operator on the terminal 2 opens his or her designated folder of those displayed folders and, by designating any given document file in the opened folder, clicks a CheckOut button. When the click operation of the CheckOut button is performed, the designated document file is read out from the designated folder in the data memory 30 and sent to the terminal 2. The thus sent document file can be edited by the operation of the operator.

After the editing of the document file has been completed, the operator on the terminal 2 clicks CheckIn button. When the click operation of the CheckIn button is performed, the edited document file is sent to the Web application server 1 to allow it to be stored in the data memory 30 in an updated form.

Where the operator on the terminal 2 creates a new document, he or she inputs any desired file name to a text box and clicks a New button. When the click operation of the New button is performed, the thus created document is sent to the Web application server 1 and stored in the data memory 30.

In the Web application server 1, at each operation being performed on the terminal 2, the corresponding meaning information is detected in step 102.

By applying a fifth-row concept conversion rule (FIG. 4) upon the click operation of the CheckOut button, meaning information is detected, meaning "The operation of the CheckOut button of Submit Type Posted under a document file management application program is done to start an edit on a document file at a Path notified under Context".

Figure 10:
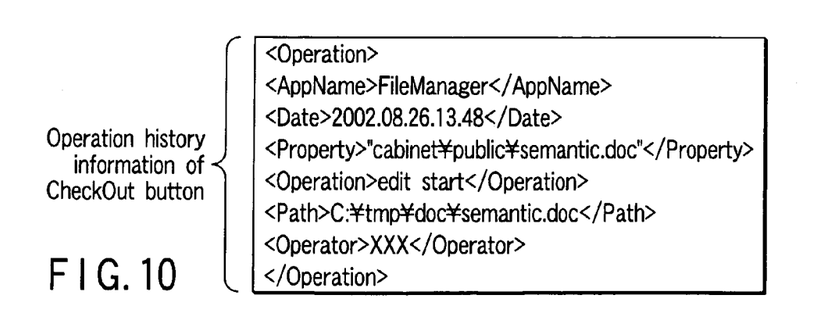
FIG. 10 is a view showing a format of one operation history information relating to a document file management in the first embodiment.

If the meaning information is detected (YES in step 103), this meaning information, together with a summary of the click operation of CheckOut button, is stored as operation history information in the history information table 32 (step 104). That is, the operation history information of the CheckOut button comprises, as shown in FIG. 10, the name of the document file management application program 13, date and hour of the click operation of the CheckOut button, meaning information, Operation Type, Path, and Operator name. The Path indicates a storage location of the document file.

By applying a sixth-row concept conversion rule (FIG. 4) upon the click operation of the CheckIn button, meaning information is detected, meaning "The operation of CheckIn button of a Submit Type Posted under the document file management application program is done to end an edit on the document file notified under Context".

When the meaning information is detected (YES in step 103), this meaning information, together with a summary of the click operation of the CheckIn button, in stored, as operation history information, in the history information table 32 (step 104).

By applying a seventh concept conversion rule (FIG. 4) upon the click operation of the New button, meaning information is detected, meaning "The operation of the New button of a Submit Type Posted under the document file management application program is done to newly create a new document notified under Context".

When the meaning information is detected (YES in step 103), this meaning information, together with a summary of the click operation of the New button, is stored as operation history information in the history information table 32 (step 104).

(4) An explanation will be made below about a search process of respective operation history information stored in the history information table 32.

Figure 11:
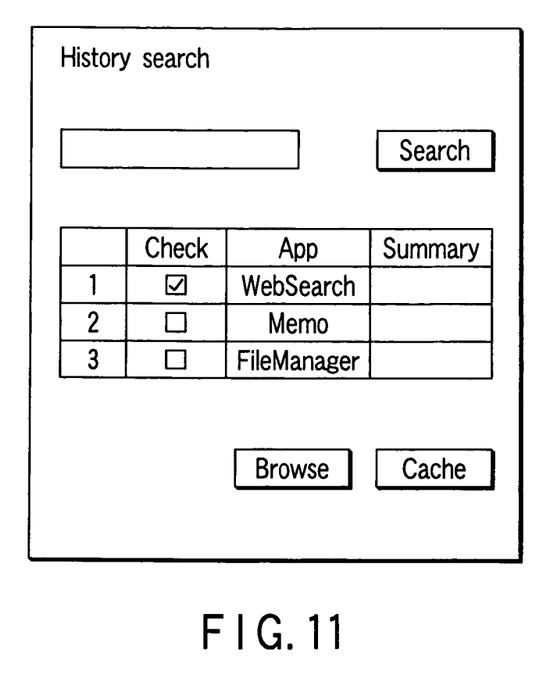
FIG. 11 is a view showing an operation screen relating to history searching in the first embodiment.

When a keyword for searching the operation history information is inputted from the terminal 2, it is decided whether or not one or more words in the inputted keyword are included in any items of the respective concept conversion rules in the concept conversion rule table 31—step 108. If included (YES in step 109), one or more pieces of operation history information including that word are searched from the history information table 32 (step 110). The discovered one or more pieces of operation history information are sent to the terminal 2 where the information is displayed on a display section (step 111).

The inputted keyword constitutes a question sentence of a natural language having a conceptual meaning, such as "What is on the Web page browsed by Mr. xxx ?". This question sentence is linguistically analyzed and at least one word "browse" is extracted. If the extracted word "browse" is included in at least one item of the respective concept conversion rule, such as Operation Type or Operation Contents, one or more pieces of operation history information including "browse" is searched from the history information table 32.

By displaying the thus discovered one or more pieces of operation history information on the display section on the terminal 2, the operator can grasp the respective operations done upon the execution of a plurality of application programs as a common concept among mutual application programs.

In a comparison, for example, between the click operation of the Cache button upon the execution of the Web searching application program 11 and the click operation of the OK button upon the execution of the memo-making application program 12, both the conceptual meanings can be grasped, though being entirely different in terms of the summary of the operation and Context, as creating a document in either case.

When, of one or more pieces of operation history information displayed, at least one is designated by the operator (YES in step 112), at least one application program associated with the designated operation history information is read out from the program memory 10 and automatically started (step 113).

In the case where the operation history information of the search button as shown in FIG. 5 for example is designated, the Web searching application program 11 is automatically started based on the application program name included in the operation history information. By this starting operation the work environment of the Web search is reproduced.

The searching process of the operation history information is performed by the search application program 14. Even in the respective operations performed upon the execution of the searching application program 14, the operation history information is stored by the repetition of the process from step 101.

(5) An explanation will be made below about the registering process of the concept conversion rule onto the concept conversion rule table 31.

When the registering mode of the concept conversion rule is set on the terminal 2 (YES in step 114), those concept conversion rules already registered in the concept conversion rule table 31 are displayed on the display section on the terminal 2 (step 115). If, in this state, an addition mode of the concept conversion rule is designated by the operator (step 116), then one or more concept conversion rules created on the terminal 2 are additionally registered in step 117. This additional registration is properly made in the case where a new application program is added to the program memory 10.

The registering process as set out above is performed under the registering application program 15. Even in the respective operations performed upon the execution of the registering application program, the operation history information is stored by the repetition of the process starting from step 101.

(6) An explanation will be made below about the process of extracting a linking pattern characteristic of a plurality of mutually associated operations from the respective operation history information.

When the linking pattern extracting mode is set on the terminal 2 (step 118), the linking pattern characteristic of a plurality of mutually associated operations is extracted from the respective operation history information in the history information table 32. For example, a linking pattern of a plurality of operations such as "The editing of the document file under the memo-making application program 12 is started, followed by the searching and browsing of the Web page under the Web search application program 11, and then the editing of the document file under the memo-making application program 12 is ended" is extracted as the most often linking pattern. The thus extracted linking pattern is displayed on the display section on the terminal 2 (step 115).

In connection with the extracted plural-operation linking pattern the operator can extract the meaning information (conceptual meaning), meaning "Respective operations are done to edit the document file while referring to the Web page".

Figure 12:
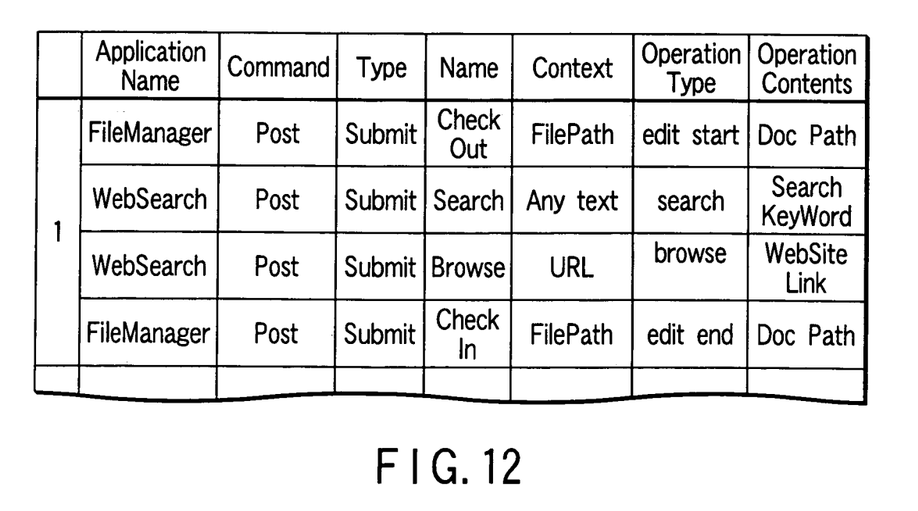
FIG. 12 is a view showing an example of new concept conversion rules additionally registered in the first embodiment.

The operator can create a concept conversion rule with a plurality of operations as a target, as shown in FIG. 12, on the basis of the extracted meaning information. The created concept conversion rule can be additionally registered on the concept conversion rule table 31 by the setting of the registering mode.

The thus extracting and registering processes can be performed under the registering application program 15. Even in the respective operations performed upon the execution of the registering application program 15, the operation history information is stored by the repetition of the process starting from step 101.

[2] An Explanation Will Be Made Below About The Second Embodiment Of The Present Invention In the second embodiment, as shown in FIG. 13, the meaning information and summary of respective operations are stored as operation history information of a job unit, that is, as operation history information of a job unit comprised of a collection of a plurality of mutually associated operations, in a history information table 32. In connection with this, the searching of the respective operation history information is also made in a job unit.

The other arrangements, functions and effects of the second embodiment are the same as those of the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for performing the management of operation history, comprising:
   a detecting section configured to, at each performance of a human input operation upon execution of a plurality of programs, detect a conceptual meaning of the respective operation;
   a memory section configured to store a respective result of detection as operation history information;
   an extracting section configured to extract, from the respective operation history information in the memory section, a linking pattern characteristic of a plurality of mutually associated operations; and
   a create section which extracts the conceptual meaning referring to a plural-operation linking pattern of a plurality of operations extracted from the extracting section, and creates a concept conversion rule with a plurality of operations as a target, based on extracted meaning information,
   wherein the detecting section comprises detecting the conceptual meaning of the respective operation by being collated with a summary of the respective operations and a plurality of initially registered concept conversion rules, and
   wherein the concept conversion rule includes a conversion rule of an application name, command, type, name, context, operation type, and operation contents.

2. The apparatus according to claim 1, further comprising a concept conversion rule table configured to store the respective concept conversion rules.

3. The apparatus according to claim 1, further comprising a searching section configured to search respective operation history information stored in the memory section for one or more pieces of operation history information, on the basis of input information, and output the searched information.

4. The apparatus according to claim 3, further comprising a control section configured to start, out of the respective programs, at least one program associated with one or more pieces of operation history information searched by the searching section.

5. The apparatus according to claim 3, wherein one of the respective programs constitutes an application program for searching by the searching section.

6. The apparatus according to claim 2, further comprising a registering section configured to register one or more concept conversion rules on the concept conversion rule table.

7. The apparatus according to claim 1, wherein the memory section is configured to store a conceptual meaning of the respective operation detected by the detecting section as operation history information of a job unit comprising a collection of a plurality of mutually associated operations.

8. A method for performing the management of operation history, comprising:
   a step of, at each performance of a human input operation upon the execution of a plurality of programs, detecting a conceptual meaning of the respective operation;
   a step of storing a result of each detection as operation history information;
   a step of extracting, from the respective operation history information, a linking pattern characteristic of a plurality of mutually associated operations;
   a step of extracting the conceptual meaning referring to a plural-operation linking pattern of a plurality of operations;
   a step of creating a concept conversion rule with a plurality of operations as a target, based on extracted meaning information; and
   a step of detecting the conceptual meaning of the respective operation by being collated with a summary of the respective operations and a plurality of initially registered concept conversion rules,
   wherein the concept conversion rule includes a conversion rule of an application name, command, type, name, context, operation type, and operation contents.

9. An apparatus for performing the management of operation history, comprising:
   a detecting section configured to, at each performance of a human input operation upon execution of a plurality of programs, detect a conceptual meaning of the respective operation;
   a memory section configured to store a respective result of detection as operation history information; and
   a control section which stores a summary of the respective operation in the memory section when the detecting section cannot detect the conceptual meaning,
   wherein the detecting section comprises detecting the conceptual meaning of the respective operation by being collated with a summary of the respective operations and a plurality of initially registered concept conversion rules, and
   wherein the concept conversion rule includes a conversion rule of an application name, command, type, name, context, operation type, and operation contents.

10. The apparatus according to claim 9, further comprising a concept conversion rule table configured to store the respective concept conversion rules.

11. The apparatus according to claim 9, further comprising a searching section configured to search respective operation history information stored in the memory section for one or more pieces of operation history information, on the basis of input information, and output the searched information.

12. The apparatus according to claim 11, further comprising a control section configured to start, out of the respective programs, at least one program associated with one or more pieces of operation history information searched by the searching section.

13. The apparatus according to claim 11, wherein one of the respective programs constitutes an application program for searching by the searching section.

14. The apparatus according to claim 10, further comprising a registering section configured to register one or more concept conversion rules on the concept conversion rule table.

15. The apparatus according to claim 9, further comprising an extracting section configured to extract, from the respective operation history information in the memory section, a linking pattern characteristic of a plurality of mutually associated operations.

16. The apparatus according to claim 10, wherein the memory section is configured to store a conceptual meaning of the respective operation detected by the detecting section as operation history information of a job unit comprising a collection of a plurality of mutually associated operations.

17. A method for performing the management of operation history, comprising:
   a step of, at each performance of a human input operation upon the execution of a plurality of programs, detecting a conceptual meaning of the respective operation;
   a step of storing a result of each detection as operation history information;
   a step of detecting the conceptual meaning of the respective operation by being collated with a summary of the respective operations and a plurality of initially registered concept conversion rules; and
   a step of storing a summary of the respective operation when the conceptual meaning cannot be detected,
   wherein the concept conversion rule includes a conversion rule of an application name, command, type, name, context, operation type, and operation contents.

* * * * *